United States Patent
Nikander et al.

(10) Patent No.: US 7,962,122 B2
(45) Date of Patent: Jun. 14, 2011

(54) SECURE TRAFFIC REDIRECTION IN A MOBILE COMMUNICATION SYSTEM

(75) Inventors: Pekka Nikander, Jorvas (FI); Jari Arkko, Kauniainen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 628 days.

(21) Appl. No.: 10/557,750

(22) PCT Filed: May 21, 2004

(86) PCT No.: PCT/EP2004/050889
§ 371 (c)(1),
(2), (4) Date: Oct. 30, 2006

(87) PCT Pub. No.: WO2004/105340
PCT Pub. Date: Dec. 2, 2004

(65) Prior Publication Data
US 2007/0186000 A1    Aug. 9, 2007

(30) Foreign Application Priority Data
May 23, 2003    (GB) .................................. 0311921.1

(51) Int. Cl.
*H04W 12/00*    (2009.01)
(52) U.S. Cl. ........ 455/411; 380/247; 380/248; 380/249; 380/250; 713/159; 713/155; 713/156; 713/157; 713/158; 370/353; 370/354; 370/355; 370/356
(58) Field of Classification Search .................. 455/410, 455/411, 415, 428; 370/400, 352, 356, 353, 370/354, 355; 380/247, 248, 249, 250; 713/151, 713/155, 156, 157, 158, 159
See application file for complete search history.

(56) References Cited

U.S. PATENT DOCUMENTS

| | | | | |
|---|---|---|---|---|
| 5,537,474 A * | 7/1996 | Brown et al. | ................. | 380/248 |
| 6,061,346 A | 5/2000 | Nordman | | |
| 6,553,219 B1 | 4/2003 | Vilander et al. | | |
| 6,591,364 B1 * | 7/2003 | Patel | .............................. | 713/170 |
| 6,785,823 B1 * | 8/2004 | Abrol et al. | ....................... | 726/7 |
| 6,807,181 B1 * | 10/2004 | Weschler | ....................... | 370/400 |
| 7,107,620 B2 * | 9/2006 | Haverinen et al. | .............. | 726/29 |
| 7,174,018 B1 * | 2/2007 | Patil et al. | ..................... | 380/258 |

(Continued)

FOREIGN PATENT DOCUMENTS
EP    0 944 203    9/1999
(Continued)

OTHER PUBLICATIONS
UK Search Report for GB 0311921.1 dated Mar. 22, 2004.
(Continued)

*Primary Examiner* — Pierre-Louis Desir
(74) *Attorney, Agent, or Firm* — Nixon & Vanderhye P.C.

(57) ABSTRACT

A method of securely initializing subscriber and security data in a mobile routing system when the subscribers are also subscribers of a radio communication network. The method comprises, within the mobile routing system, authenticating subscribers to the mobile routing system using an authentication procedure defined for the radio communication network, collecting subscriber information from relevant nodes of the radio network, and agreeing upon keys by which further communications between the subscribers and the mobile routing system can take place, and using the subscriber information and keys in the provision of mobility services to subscriber mobile nodes and correspondent nodes.

8 Claims, 1 Drawing Sheet

U.S. PATENT DOCUMENTS

| | | | |
|---|---|---|---|
| 7,177,641 B1* | 2/2007 | Miernik et al. | 455/435.1 |
| 7,181,196 B2* | 2/2007 | Patel | 455/411 |
| 7,298,847 B2* | 11/2007 | Jing et al. | 380/247 |
| 7,418,596 B1* | 8/2008 | Carroll et al. | 713/169 |
| 2001/0009025 A1* | 7/2001 | Ahonen | 713/161 |
| 2002/0012433 A1* | 1/2002 | Haverinen et al. | 380/247 |
| 2002/0031107 A1* | 3/2002 | Li et al. | 370/338 |
| 2002/0080752 A1 | 6/2002 | Johansson et al. | |
| 2003/0039234 A1* | 2/2003 | Sharma et al. | 370/338 |
| 2003/0061480 A1 | 3/2003 | Le et al. | |
| 2003/0067923 A1* | 4/2003 | Ju et al. | 370/395.3 |
| 2003/0091013 A1* | 5/2003 | Song et al. | 370/338 |
| 2003/0091030 A1* | 5/2003 | Yegin et al. | 370/352 |
| 2003/0212774 A1* | 11/2003 | Lee et al. | 709/222 |
| 2003/0233329 A1* | 12/2003 | Laraki et al. | 705/52 |
| 2004/0018829 A1* | 1/2004 | Raman et al. | 455/406 |
| 2004/0091117 A1* | 5/2004 | Narayanan | 380/277 |
| 2005/0078824 A1* | 4/2005 | Malinen et al. | 380/247 |
| 2005/0100120 A1* | 5/2005 | Barton et al. | 375/347 |
| 2005/0102529 A1* | 5/2005 | Buddhikot et al. | 713/200 |
| 2007/0208864 A1* | 9/2007 | Flynn et al. | 709/227 |

FOREIGN PATENT DOCUMENTS

| | | |
|---|---|---|
| EP | 1 244 271 | 9/2002 |
| WO | 03/015360 | 2/2003 |

OTHER PUBLICATIONS

International Search Report for PCT/EP2004/050889 dated Nov. 3, 2004.

* cited by examiner

SECURE TRAFFIC REDIRECTION IN A MOBILE COMMUNICATION SYSTEM

INTRODUCTION

This application is the US national phase of international application PCT/EP2004/050889 filed 21 May 2004, which designated the U.S. and claims priority to GB 0311921.1 filed 23 May 2003, the entire content which is hereby incorporated by reference This case describes secure traffic redirection in a mobile communication system and in particular to a method and apparatus for enabling a mobile node to securely perform transactions, relating to traffic redirection, with a home network.

BACKGROUND

In traditional cellular telephone networks, mobile nodes are able to roam between cells without the need to drop ongoing telephone calls. With the introduction of mobile IP services, solutions have been sought to allow mobile IP nodes to roam within and even between different access networks (such as UMTS or WLAN) with only the minimum disruption to services. The preferred solutions are based on the idea of allowing traffic flows to be redirected to the current location of the mobile node.

In one solution, known as Mobile IPv6, the traffic flows are identified by a stable IPv6 address and are routed to the home network of the mobile node before forwarding to the current "care-of-address" of the mobile node. When the mobile node roams between access nodes, an update message containing a new care-of-address is sent to the home network. In another solution known as Host Identity Protocol (HIP), a public key (or a hash of a public key) identifies the traffic flows. In either case, a stable forwarding agent is required somewhere in the network so that other nodes can contact the mobile node without previous knowledge of the current location of the mobile node.

In Mobile IPv6, this stable forwarding agent is called the Home Agent, and a security association must exist between the Home Agent and the mobile node in order to prevent unauthorised location updates being acted upon. In HIP, there is no need for such a security association as the public key can be used directly to identify a particular node in a secure manner. However, in order for other nodes to learn the public key of the HIP-based mobile node, this public key must be stored in a Domain Name System (DNS) server in a secure manner. Therefore, in both cases the mobile node must be capable of securely performing transactions with its "home network", either for the purpose of talking to its Home Agent or for updating the DNS server to store its public key at the deployment phase.

Typically, the set-up of the security association (SA) for the home agent or the update of the DNS server might be performed manually. While parts of these operations have been automated, for instance through the use of a public key infrastructure, the authorisation step has to date remained a manual operation. In Mobile IPv6, this step involves a decision on whether the particular mobile node (even with a certificate from a trusted third party) is allowed to use a particular IPv6 address. This step is not easy to automate through public key infrastructure, given that the infrastructure would typically be unable to tell which IP address assignments are made in the network. In HIP, the procedure is easier but requires the existence of a public key infrastructure and requires that a determination has been made as to whether the mobile node is allowed to control the given domain name. The existence of such a public key infrastructure can be seen as redundant and unnecessary, given that the purpose of the DNS system is to act as a public key infrastructure—it would be strange to require another public key infrastructure to enter data into a DNS server.

The above technical problems are likely to lead to a service deployment problem in future networks. It is unacceptable from a business perspective to require manual work in order to set up each and every mobile node (out of millions) for the mobility service.

SUMMARY

It is an object to make use of existing security mechanisms to bootstrap whatever security may be required by the mobility services and mechanisms.

According to a first aspect there is provided a method of securely initializing subscriber and security data in a mobile routing system when the subscribers are also subscribers of a radio communication network, the method comprising:

within the mobile routing system, authenticating subscribers to the mobile routing system using an authentication procedure defined for the radio communication network, collecting subscriber information from relevant nodes of the radio network, and agreeing upon keys by which further communications between the subscribers and the mobile routing system can take place; and using said subscriber information and keys in the provision of mobility services to subscriber mobile nodes and correspondent nodes.

Preferably, messages associated with said step of authenticating subscribers to the mobile routing system are transported between the mobile node used by a subscriber and an authentication server of the subscriber's home network via a mobility server. The mobility server collects subscriber information from relevant nodes (subscriber databases) of the cellular radio network, and receives a shared key or key from the authentication server following completion of the re-run authentication procedure.

Preferably, session keys agreed upon during the re-run authentication procedure are sent by the authentication server to the mobility server.

In a first example embodiment the mobile routing system is a MobileIP based system, in which case the mobility server is a Home Agent. In an alternative example embodiment the mobile routing system is a HIP based system and the mobility server is a Forwarding Agent.

By way of example, said authentication procedure may be the Authentication and Key Agreement (AKA) procedure. Other procedures may of course be utilised.

According to a second aspect there is provided a method of operating a mobile node for use in a mobile radio communication system, the method comprising:

initiating an authentication procedure defined for the radio communication network, for the purpose of authenticating the mobile node to a mobile routing system, and conducting said procedure with an authentication server via a mobility server of the mobile routing system.

According to a third aspect there is provided a method of operating a mobility server of a mobile routing system, the method comprising:

relaying messages associated with an authentication procedure, between a mobile node and an authentication node;

following completion of said procedure, receiving a shared secret from the authentication server, and collecting subscriber information from the authentication server and/or other network nodes; and using said subscriber information and keys in the provision of mobility services to subscriber mobile nodes.

According to a fourth aspect there is provided a method of operating an authentication server of a mobile radio communication network, the method comprising;

conducting an authentication procedure with a mobile node via a mobility server; and sending a shared secret resulting from said procedure to said mobility server.

DETAILED DESCRIPTION

Figure 1:
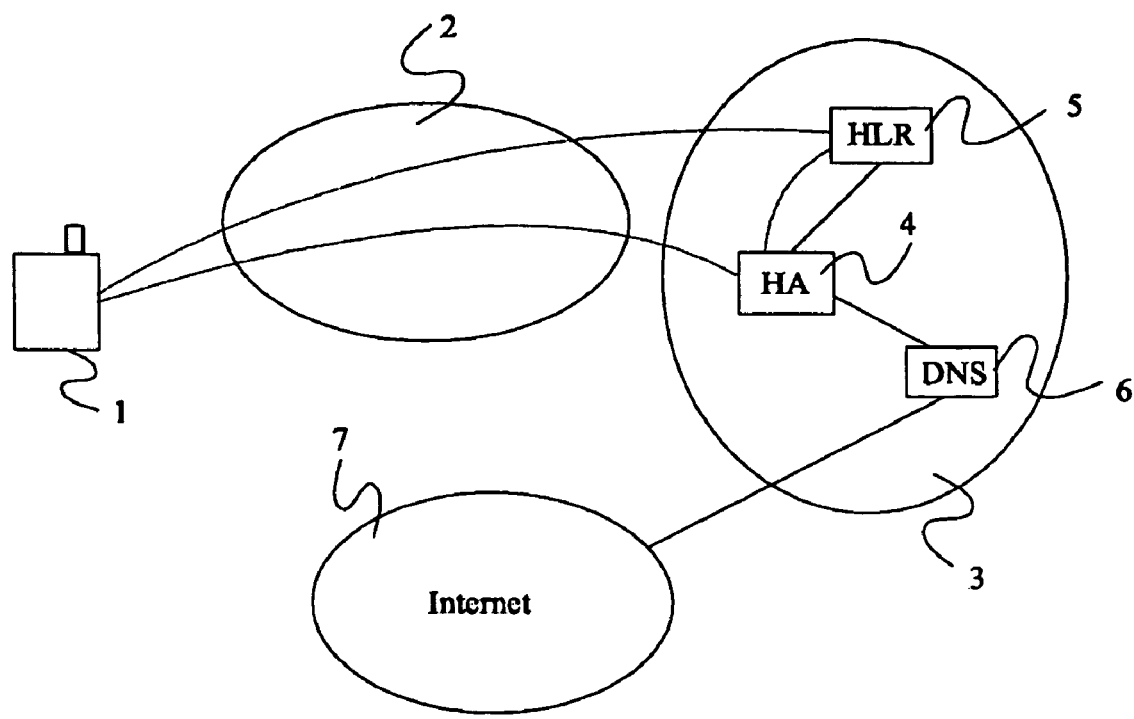
FIG. 1 illustrates schematically a mobile radio communication system incorporating a mobility routing system.

Procedures have been defined and specified for allowing a mobile node to be securely authenticated by a home network in a cellular communication system. For example, the 3GPP authentication procedure known as Authentication and Key Agreement (AKA) makes use of a secret key stored in the Subscriber Identity Module (SM) card of a cellular device and in the HSS node of the subscriber's home network to authenticate the cellular device (or rather the SIM card) at the network level. In the case of a roaming cellular device, the AKA procedure is performed via the visited network, with the home network informing the visited network of the authentication decision. While alternatives to AKA exist and fall within the scope of the claims, the present discussion will be restricted to AKA by way of non-limiting example.

Use of the AKA procedure for network level authentication will typically allow a subscriber to make phone calls but does not necessarily authenticate a mobile node for particular services. Considering IP mobility services such as Mobile IP and HIP, a separate authentication procedure is required. As already discussed, these separate procedures have in the past been carried out manually.

It is proposed here to reuse the AKA procedure and the associated secret shared between a mobile node (SIM card) and a home network for the purpose of authenticating a mobile node to a mobile routing system. Considering firstly the case of Mobile IP, FIG. 1 illustrates in simplified form a typical system architecture. A mobile node 1 is currently attached to a visited network 2. It is assumed that the AKA procedure has previously been run in order to authenticate the mobile node to the home network 3 and hence to the visited network 2. The mobile node 1 therefore has access to the foreign network at the network level. The procedure may comprise the following steps:

Step 1. The mobile node 1 establishes (IP) network connectivity by establishing a connection through GPRS, for instance. As already stated, this step assumes that the AKA procedure has been carried out to provide network access authentication. However, this step is considered to be independent from the IP mobility authentication procedure, even if both procedures use the same SIM card.

Step 2. The mobile node initiates an authentication procedure with the Home Agent 4 of the mobile routing system.

Step 3. The Home Agent 4 relays messages between the mobile node I and the authentication server (HLR) 5 of the home network 3 in order to execute (i.e. re-run) the AKA (USIM) authentication between the Home Agent and the mobile node. This involves the following steps:

The mobile node 1 sends its identity to the HLR.

The HLR 5 sends a challenge to the mobile node 1.

The mobile node 1 optionally verifies the authenticity of the HLR's challenge.

The mobile node sends a response to the HLR.

The HLR verifies the authenticity of the mobile node's response.

The HLR optionally sends an acknowledgement back to the mobile node.

Both the mobile node and the HLR establish shared session key(s), such as the USIM CK and IK.

Step 4. The HLR 5 forwards the results of the re-run AKA procedure (including session keys) to the Home Agent 4.

Step 5. The mobile node 1 generates a public key pair.

Step 6. The mobile node 1 sends a message to the Home Agent 4, protected using the shared session key(s) established in Step 3. The message contains the following information:

The public key of the mobile node.

An optional signature of the mobile node, made using the private key associated with the public key.

Optional desired parameters, such as a desired fully qualified domain name (FQDN).

Optional shared secret (if provided, this part must be encrypted).

Step 7. The Home Agent 4 verifies the authenticity of the mobile node's message through the use of the shared session key(s) and optionally using the signature.

Step 8. The Home Agent 4 collects certain predefined information from the HLR 5 and possibly other subscriber databases, as well as the current contents of the local DNS server 6 (zone). This information may comprise for example:

The name and postal address of the user associated with this SIM card.

The telephone number associated with this SIM card.

The existing FQDNs in the DNS (either for this particular subscriber or for others).

The status of any mobility services established earlier for the particular subscriber or SIM card.

Step 9. The Home Agent 4 makes a decision about a suitable FQDN and/or IP address which can be assigned to the device. For instance, the Home Agent can check the desired FQDN for consistency with the operator's domain name (e.g. soneranet), the user's phone number or name (e.g., matti-virtanen.soneranet), and the existence of possible previous entities with the same FQDN. The Home Agent also makes the necessary configurations in the following entities:

The local DNS server 6 (using for example the Dynamic DNS protocol), where the selected FQDN and the associated public key are stored One or more of the subscriber databases (possibly including a change in the billing information).

Step 10. The Home Agent 4 communicates the configuration back to the mobile node, including:

The chosen FQDN and, optionally, IP address

Optionally, the public key of some network node used by the device (such as the Home Agent).

Step 11. The mobile node 1 stores the received information. Note that this information has to be handled in a special way if a separation exists between a device and the user's credentials such as is common in phones and SIM cards inserted into them. Leaving the information in the device for use by any user (SIM card) would allow the use of this information by other users. This risk can be mitigated by storing the received information in the SIM, or storing it in the device in a manner which is not accessible after another SIM has been inserted.

As a result of the AKA re-run and the collection and distribution of data by the Home Agent, the mobile node can now use mobility services in a secure manner. Communications between the Home Agent and the mobile node can be secured using the public key and/or shared secret.

Considering the HIP scenario, the Home Agent is replaced by a Forwarding Agent (or anchor point). It is the Forwarding Agent which acts as the intermediary between the mobile node and the HLR during the AKA re-run. In addition to the procedures outlined above, in Step 9 the address of the Forwarding Agent is stored in the DNS server. The mobile node's public key and the address of the forwarding agent can then be retrieved by third parties from the DNS server via the Internet 7, and communications can flow to the mobile node regardless of its current position and IP address.

There may be proposals that make use of cell phone authentication in other contexts (e.g. RFC 3310). But here the authentication procedure is used in a specific way for a specific application, with additional procedures for collecting at the mobility server (i.e. the Home or Forwarding Agent) information from the subscriber database or databases.

There may be proposals that make use of cell phone authentication even in the context of, e.g., Mobile Ipv6. However, such proposals would use such authentication each time a transaction is carried out between the mobile node and the mobility server, and lack a mechanism to decide the IP addresses and FQDNs.

There also may be proposals to use cell phone and other legacy authentication mechanisms to generate so called subscriber certificates in a general fashion, suitable for any application. However, the technology described here avoids this step, and avoid the use of any PKI other than the resulting DNS system as a "weak" form of PKI. In addition, the technology here can make the necessary authorisation decisions regarding FQDNs and IP addresses, unlike the existing proposals.

Standard protocols exist for making dynamic updates to DNS. However, currently these are secured with pre-provisioned shared secrets (DNS TSIG) or other mechanisms which can provide a shared secret, such as Kerberos (GSS TSIG) or secure DNS. All of these mechanisms today make the security decisions without regard to the specific entity that is making the request. This is insufficient, as it is necessary for a specific node to control its own IP address and DNS name, but not the addresses and names of other nodes. The proposals presented here deal with this by combining the user database and the authentication procedure.

Example embodiments enable easy deployment of mobility services in heterogeneous networks.

The above discussion has considered the scenario where the access network is the same when both the initial, network level authentication procedure and the re-run procedure are carried out. A question to be addressed is what happens if a mobile node moves between different access networks which might use different authentication procedures. Consider for example the scenario in which a mobile node roams between a UMTS access network and a WLAN access network. While the UMTS network will use AKA to authenticate subscribers at the network level, the WLAN network might use some other procedure at this level. The technology described encompasses the possibility that, after the WLAN network level access procedure has been carried out, the AKA procedure is reused to authorise the subscriber in respect of the mobility service.

It will be appreciated by the person of skill in the art that various modifications may be made to the embodiments described above without departing from the scope of the claims.

The invention claimed is:

1. A method of securely authenticating subscriber and security data in a mobile routing system when the subscribers are also subscribers of a radio communication network, the method comprising:
    performing a first run of an authentication and key agreement procedure in the radio communication network, between a mobile node and an authentication server of the radio communication network, so as to authenticate the mobile node to the radio communication network;
    initiating an authentication procedure with a stable forwarding agent of the mobile routing system;
    performing a second run of the authentication and key agreement procedure between the mobile node and the authentication server so as to generate a shared secret;
    providing the shared secret to the stable forwarding agent and using the shared secret to authenticate the mobile node to the stable forwarding agent;
    sending a public key from the mobile node to the stable forwarding agent;
    agreeing upon keys by which further communications between the mobile node and the stable forwarding agent can be secured;
    following authentication of the mobile node to the stable forwarding agent, collecting at the stable forwarding agent subscriber contact information from said authentication server;
    using the subscriber contact information to assign a Fully Qualified Domain Name and/or IP address to the mobile node; and
    updating a subscriber database and DNS server with the Full Qualified Domain name and/or IP address and the public key provided by the mobile node.

2. A method according to claim 1, further comprising:
    transporting messages associated with the second run, between the stable forwarding agent used by a mobile node and the authentication server via the stable forwarding agent.

3. A method according to claim 1, further comprising:
    sending session keys, agreed upon during the second run of the authentication procedure from the authentication server to the stable forwarding agent.

4. A method according to claim 1, further wherein the mobile routing system is a Mobile IP based system, and the stable forwarding agent is a Home Agent.

5. A method according to claim 1, wherein the mobile routing system is a HIP based system.

6. A method according to claim 1, wherein said authentication and key agreement procedure is the Authentication and Key Agreement procedure specified by 3GPP.

7. A method according to claim 1, wherein the collected subscriber contact information comprises one or more of the following:
    the name and postal address of a subscriber;
    the telephone number associated with a subscriber;
    the existing Fully Qualified Domain Name for a subscriber; and
    the status of any mobility services established earlier for a subscriber.

8. A stable forwarding agent of a mobile routing system for use in securely authenticating subscriber and security data in the mobile routing system, the mobile routing system having subscribers who are also subscribers of a radio communication network, where a first run of an authentication and key agreement procedure has been performed in the radio communication network between a mobile node and an authentication server of the radio communication network so as to authenticate the mobile node to the radio communication network, the stable forwarding agent comprising:
- a relay for relaying messages associated with a second run of the authentication and key agreement procedure between the mobile node and the authentication node of the radio communication network, the second run follows the first run and results in generation of a shared secret;
- a receiver for receiving and using the shared secret to authenticate the mobile node, for collecting subscriber contact information from the authentication server, and for receiving a public key from the mobile node;
- a key determining processor for agreeing upon keys by which further communications between the mobile node and the stable forwarding agent can be secured; and
- a mobility service provisioning processor for using the subscriber contact information to assign a suitable Fully Qualified Domain Name and/or IP address to said mobile node and for updating a subscriber database and DNS server with the Fully Qualified Domain name and/or IP address and the public key provided by the mobile node.

* * * * *

UNITED STATES PATENT AND TRADEMARK OFFICE
CERTIFICATE OF CORRECTION

| | |
|---|---|
| PATENT NO. | : 7,962,122 B2 |
| APPLICATION NO. | : 10/557750 |
| DATED | : June 14, 2011 |
| INVENTOR(S) | : Nikander et al. |

Page 1 of 1

It is certified that error appears in the above-identified patent and that said Letters Patent is hereby corrected as shown below:

In Column 3, Line 25, delete "(SM)" and insert -- (SIM) --, therefor.

In Column 3, Line 63, delete "node I" and insert -- node 1 --, therefor.

In Column 4, Line 43, delete "soncranet)," and insert -- sonera.net), --, therefor.

In Column 4, Line 44, delete "matti-virtanen.soneranet)," and
insert -- matti-virtanen.sonera.net), --, therefor.

In Column 6, Line 36, in Claim 1, delete "Full" and insert -- Fully --, therefor.

In Column 6, Line 36, in Claim 1, delete "name" and insert -- Name --, therefor.

In Column 6, Line 45, in Claim 3, delete "procedure" and insert -- procedure, --, therefor.

In Column 8, Line 10, in Claim 8, delete "name" and insert -- Name --, therefor.

Signed and Sealed this
Twentieth Day of December, 2011

David J. Kappos
*Director of the United States Patent and Trademark Office*